Figure 1:
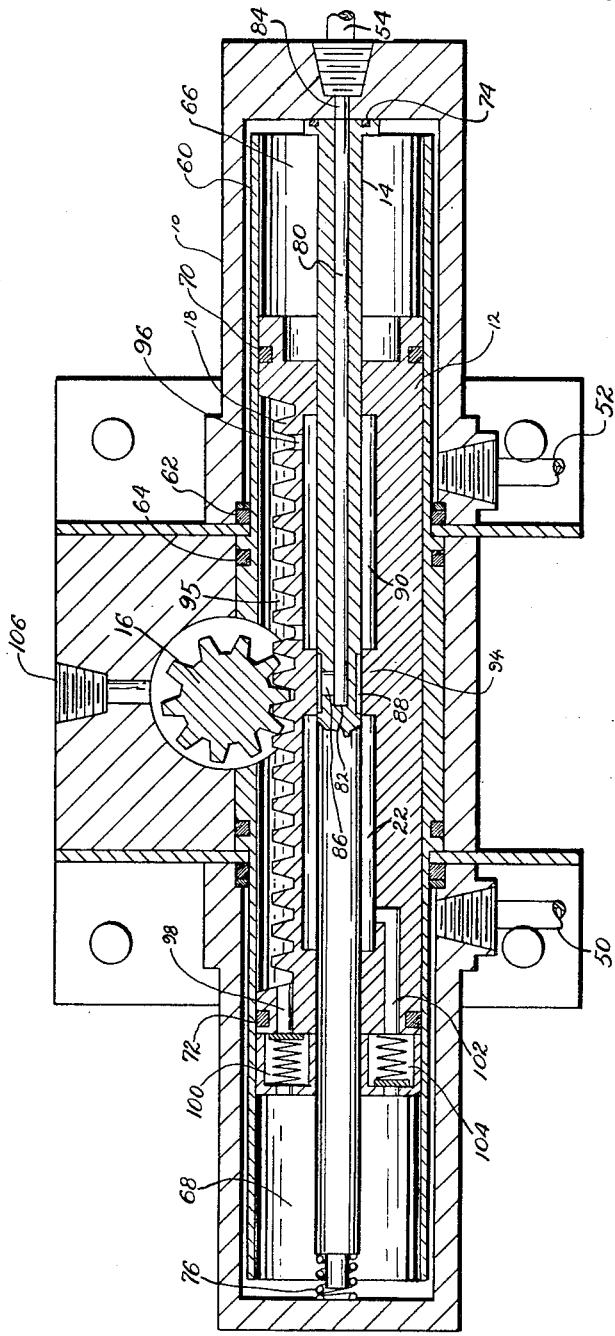

Oct. 5, 1965  W. P. DUNPHY  3,209,541
HYDRAULIC REMOTE CONTROL APPARATUS
Filed July 29, 1963  6 Sheets-Sheet 1

INVENTOR
WILLIAM P. DUNPHY
BY Featherstonhaugh & Co
ATTORNEYS

Oct. 5, 1965   W. P. DUNPHY   3,209,541
HYDRAULIC REMOTE CONTROL APPARATUS
Filed July 29, 1963   6 Sheets-Sheet 2

INVENTOR
WILLIAM P. DUNPHY
BY Fetherstonhaugh & Co
ATTORNEYS

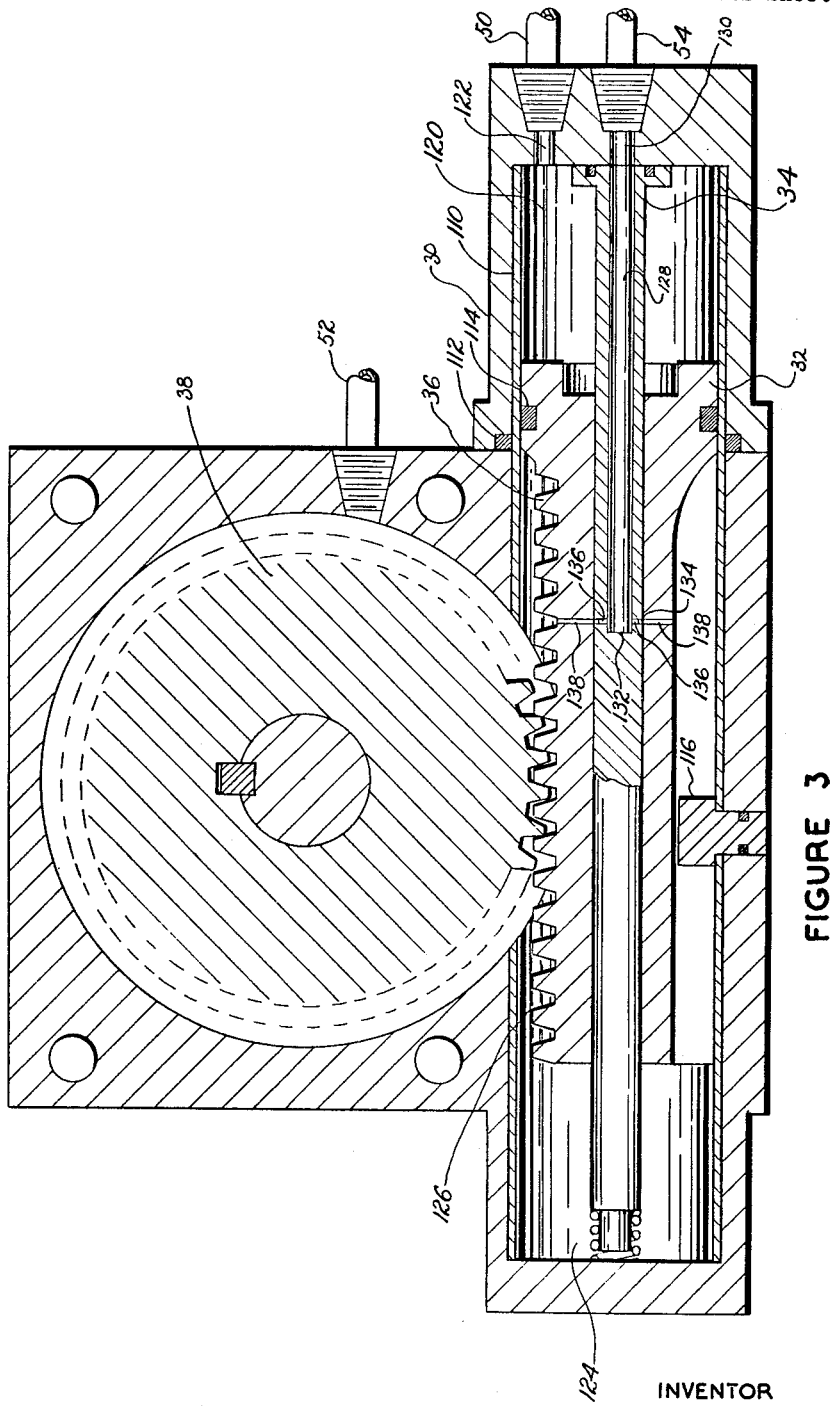

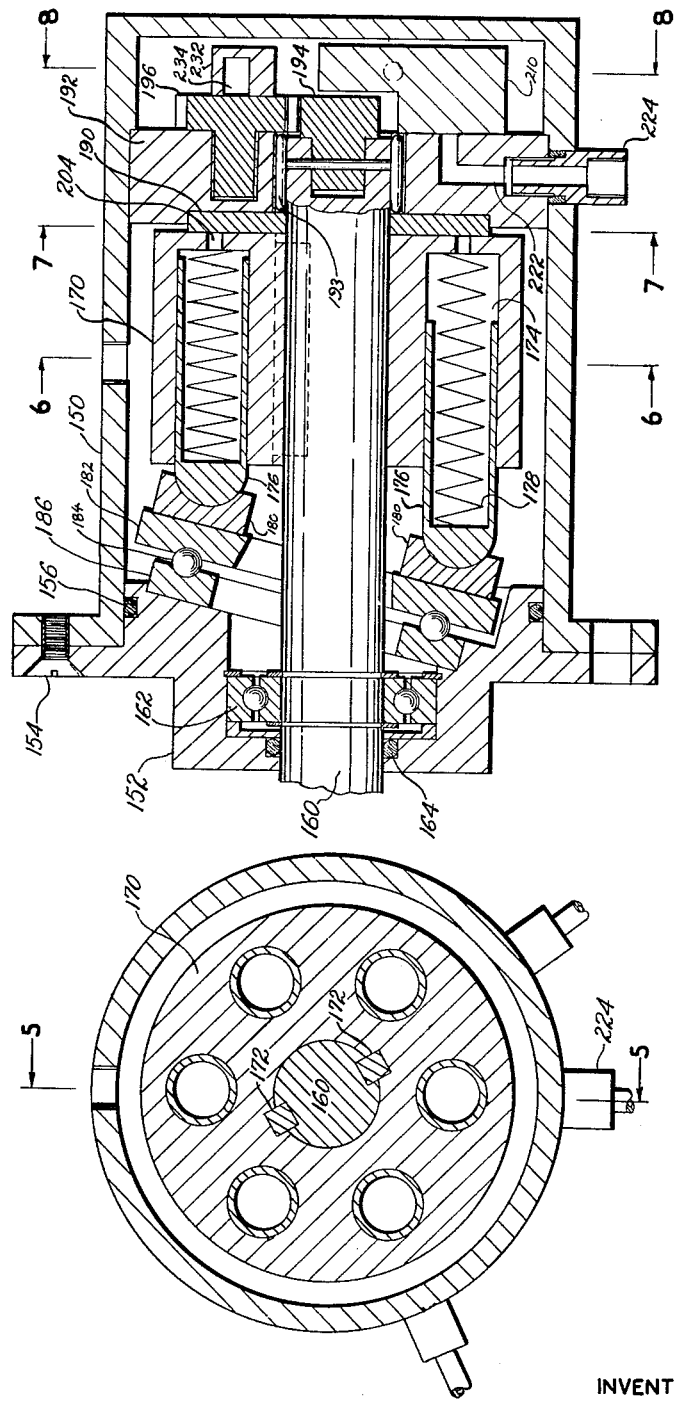

Oct. 5, 1965  W. P. DUNPHY  3,209,541
HYDRAULIC REMOTE CONTROL APPARATUS
Filed July 29, 1963  6 Sheets-Sheet 5

INVENTOR
WILLIAM P. DUNPHY
BY~ Featherstonhaugh & Co
ATTORNEYS

Oct. 5, 1965   W. P. DUNPHY   3,209,541
HYDRAULIC REMOTE CONTROL APPARATUS
Filed July 29, 1963   6 Sheets-Sheet 6

INVENTOR
WILLIAM P. DUNPHY
BY ~ *Fetherstonhaugh & Co*
ATTORNEYS

United States Patent Office 3,209,541
Patented Oct. 5, 1965

3,209,541
HYDRAULIC REMOTE CONTROL APPARATUS
William P. Dunphy, 18 Nora Road, Islington,
Ontario, Canada
Filed July 29, 1963, Ser. No. 298,254
8 Claims. (Cl. 60—54.5)

This invention relates to hydraulic remote control devices, and is particularly concerned with a hydraulic steering gear control device for marine vessels, which is capable of automaitc self-synchronism.

While the device is particularly adapted to the control of steering gear of marine vessels, its utility is not limited to marine vessel steering gear, as it has broad application wherever it is desired to control the operation of a first device by a second remote device through hydraulic interconnection. For the purposes of explaining the invention, however, the invention is described hereinafter as employed to control marine vessel steering mechanisms.

The control apparatus in accord with this invention is primarily intended for vessels that can be steered by manually applied loads along, and without assistance from a power booster, but it will combine readily with a steering engine and consequently can be regarded as adaptable to vessels of all sizes, from small outboard engine cruisers to the largest ocean-going vessels.

All hydraulic remote control devices employ a master component and a slave component, positioned respectively at the controlling end and at the controlled end of a hydraulic system extending between them. In the case of marine vessel steering gear, the master component is located at, and operated by, the steering wheel, while the slave component is located at, and controls the movements of the rudder. The master and slave components are more commonly known as actuator and slave units, respectively.

In all hydraulic remote control devices, there is a fundamental design problem concerning the maintenance of synchronism between the movement of the slave and master units. Several influences, including temperature changes, gland leaks, and others, tend to upset synchronism, and the efficiency of a control device is largely dependent on its success in maintaining synchronism. To be practical, the maintenance of synchronism. To be practical, the maintenance of synchronism should be automatic, whereby to avoid cumulative de-synchronization to a critical degree.

The remote control device in accord with the present invention is particularly adaptable to applications which operate to either side of a neutral or datum point, as distinct from those which operate to one side of a datum only. A rudder, for instance, must move to either port or starboard from a neutral point at midships, whereas an engine throttle must move from idle setting to somewhere between there and full throttle, always returning sooner or later to idling setting.

In the case of remote control devices which operate to one side of a datum only, synchronization normally takes place at the datum point, which is always at one end of the cycle of movement. However, this is not acceptable in the case of a rudder control which could conceivably function for long periods without once moving to either full port or full starboard helm. This type of control must be re-synchronized when in the neutral zone at approximately midships, because the nature of its operation dictates frequent passing to or through this setting.

It is the primary object of this invention, therefore, to provide a hydraulic remote control device which is particularly adapted to applications which operate to either side of a neutral or datum point, and which is capable of automatic resynchronization as this datum point is passed from either direction.

It is a more specific object of the invention to provide a hydraulic remote control device for interconnecting the steering wheel and the rudder of marine vessels.

The invention will be more thoroughly understood from the following description of a preferred embodiment thereof as read in conjunction with the accompanying drawings.

Figure 4:
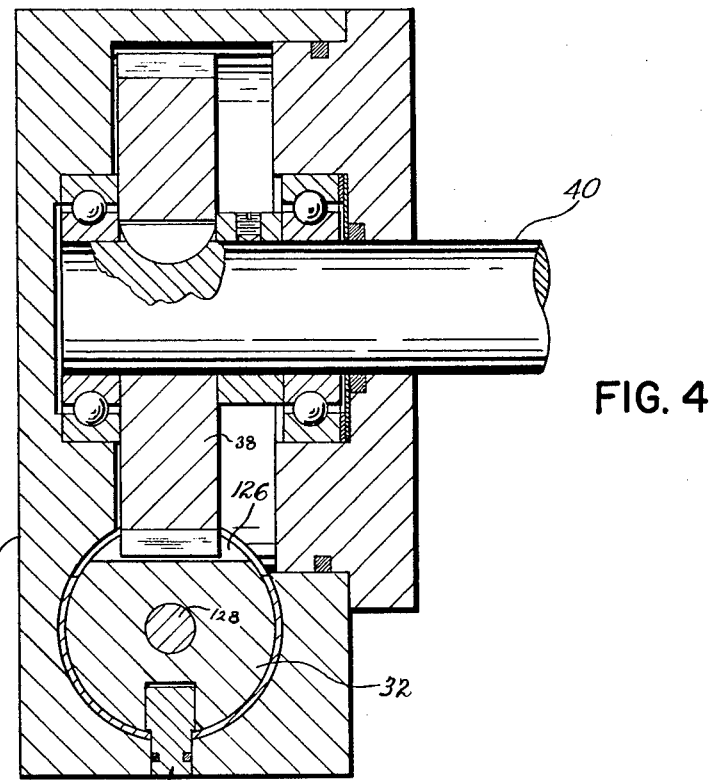
Figure 2:
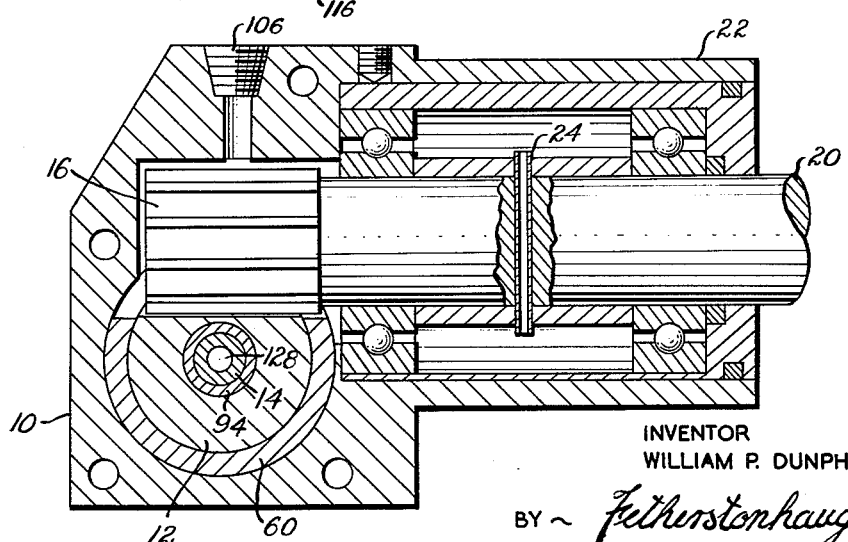
Figure 8:
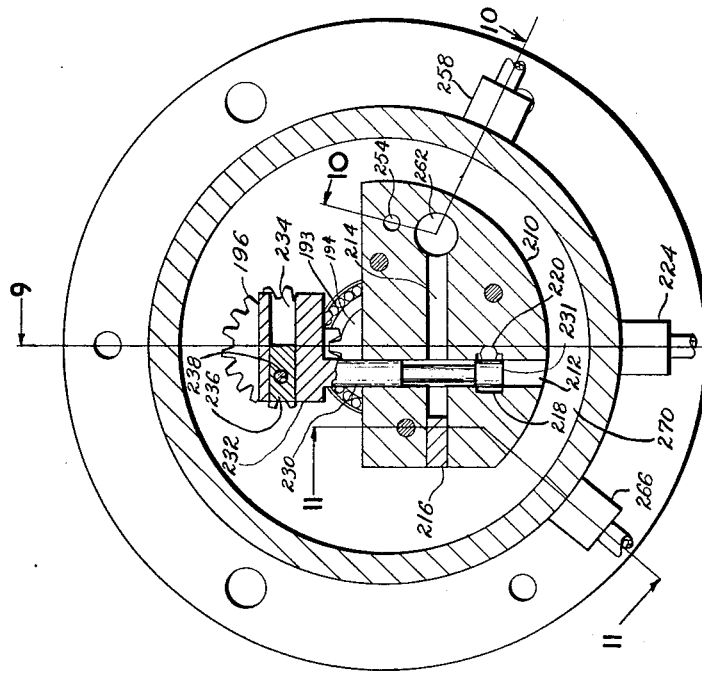
Figure 7:
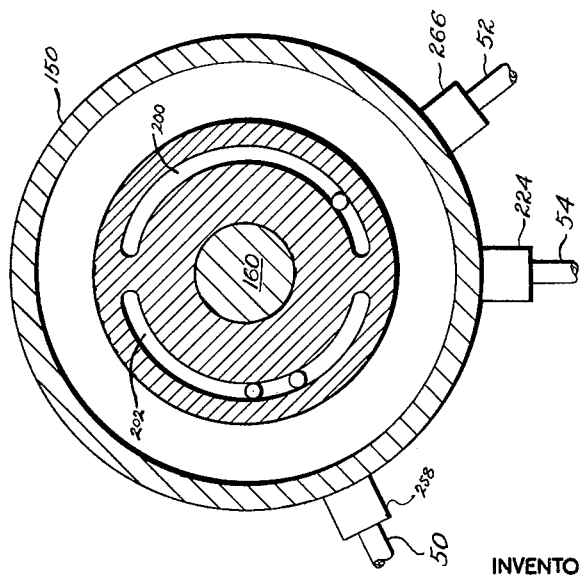
Figure 10:
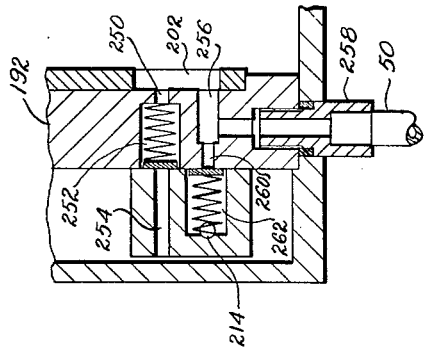
Figure 9:
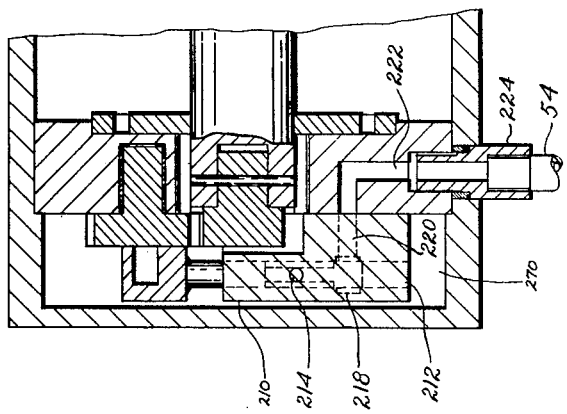
Figure 11:
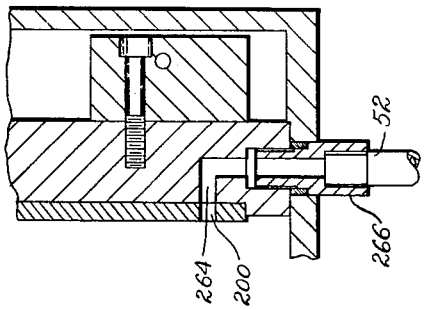

In the drawings,

FIGURE 1 is a cross-section view taken through the longitudinal axis of an actuator or master unit of a remote control apparatus in accord with the invention, FIGURE 2 is a cross-sectional view taken on a line extending transversely through the center of the actuator unit shown in FIGURE 1, FIGURE 3 is a cross-sectional view taken on the longitudinal axis of a slave unit of a remote control device in accord with the invention, FIGURE 4 is a cross-sectional view taken on a line extending transveresly through the center of the slave unit shown in FIGURE 3, FIGURE 5 is a cross-sectional view taken through the longitudinal axis of an actuator or master unit in accord with a second preferred embodiment of the invention, FIGURE 6 is a cross-sectional view taken along the line 6—6 of FIGURE 5, FIGURE 7 is a cross-sectional view taken along the line 7—7 of FIGURE 5, FIGURE 8 is a cross-sectional view taken along the line 8—8 of FIGURE 5, FIGURE 9 is a cross-sectional view taken along the line 9—9 of FIGURE 8 and FIGURE 10 is a cross-sectional view taken along the line 10—10 of FIGURE 8, and FIGURE 11 is a cross-sectional view taken along the line 11—11 of FIGURE 8.

The actuator unit illustrated in FIGURE 1 essentially consists of a cylinder 10, a piston 12 adapted to reciprocate within the cylinder, and coaxially mounted on a longitudinally extending rod 14. A pinion gear 16 engages a rack 18, carried by the piston. Piston 12 thus constitutes a pumping means. As shown in FIGURE 2, pinion 16 is coupled to a shaft 20 of the device controlling the actuator. In the case wherein the invention is employed in the steering gear of vessels, shaft 20 may be directly coupled to the steering wheel.

In FIGURE 2, shaft 20 is shown as mounted within a bearing assembly 22, and is provided with a shear pin 24. However, this particular arrangement of shaft 20 is not essential to the invention, as this arrangement does not form part of the invention, it being necessary only to understand that the rotation of pinion gear 16 is effected by a prime mover constituting the controlling mechanism of the total system, whether this be a hand operated steering wheel or a booster engine, as the case may be.

Briefly referring to FIGURE 3, the illustrated slave unit is similarly constructed of a cylinder 30, a piston 32 reciprocating on a rod 34. Piston 32 also carries a rack 36, which is geared with pinion gear 38, which is keyed to shaft 40 (FIGURE 4). In the case of marine vessel steering gear, shaft 40 would control the movements of the vessel's rudder.

By way of introduction to the operation of the device, it will be noted that its purpose is to translate rotation of the primary shaft 20 to shaft 40, by causing the slave unit piston 32 to follow accurately, in accordance with a predetermined ratio, movement of the actuator unit piston 12. As is explained in detail below, it is the specific object of the invention to provide means for automatic synchronization between the shafts, or more particularly, between the pistons 12 and 32.

It will be understood that the device as briefly described above contains pressure fluid, such as an oil commonly used in hydraulic control devices. Conduit means is used to effect hydraulic interconnection between the actuator and slave units, and consists of three separate conduits 50, 52 and 54. These preferably comprise small-bore pipe lines, which, in the case of a marine vessel installation, can conveniently be passed through waterproof bulkheads or diverted to avoid obstructions, as often or as sharply as installation convenience dictates.

As mentioned above, this type of hydraulic control device can become de-synchronized, due to leakage of pressure fluid past faulty sealing glands, and with changes in the pressure fluid volume with temperature variations. If the de-synchronization is allowed to continue for any length of time, serious consequences can develop. It is possible, for example, to have a complete loss of synchronization within a marine vessel steering gear, such that full movement of the steering wheel to the port side does not result in a movement of the rudder beyond amidship position. As stated previously, it is essential to effect synchronization within steering gear systems without relying on movement of the steering wheel to either of the extreme positions, as it is conceivable that a vessel might be operated for a long period of time with the steering wheel only being moved back and forth through the central datum position within a narrow range of only a few degrees on either side of the datum position. It is, therefore, the primary object of this invention to effect automatic synchronization under the conditions just described.

Referring again to FIGURE 1, the cylinder 10 has an internal cylindrical bore, and is preferably provided with a cylinder liner 60, as the use of a liner gains certain advantages in the manufacture and assembly process. Further, as the cylinder wall is broached to permit installation of the pinion gear 16, it is advantageous to form the cylinder of three components which are internally interconnected by cylinder liner 60. Sealing glands such as those indicated by the reference numerals 62 and 64, are employed to effect the seal between the components forming cylinder 10, and the cylinder liner 60.

The two opposed ends of cylinder 10, or more precisely of cylinder liner 60, constitute separate chambers defined by the walls of the opposed ends of the internal bore within cylinder 10 and the ends of piston 12. These chambers 66 and 68 are of varying volume, as piston 12 reciprocates, and they are sealed from one another by sealing glands 70 and 72.

Extending along the longitudinal axis of cylinder 10, there is a rod 14 which is sealed against one end of the cylinder by the sealing gland 74, and it is biased to maintain a fluid-tight seal at gland 74 by means of a spring 76, carried at the opposite end of the rod. Once again, this particular arrangement of the rod is a preferred mounting arrangement, which is used for the advantages gained in assembling the device.

Piston 12 is axially bored and rides on rod 14, with the surface of the rod and the surface of the internal bore of the piston being closely machined as to accomplish a fluid-tight seal therebetween.

A bore 80 extends through rod 14 from one end to a point between the ends thereof at 82. Bore 80 is axially aligned with a passageway 84, through the adjacent end of cylinder 10, and is therefore, in fluid connection with conduit 54. Adjacent the end 82 of bore 80, rod 14 is provided with a radial hole 86, which enters into an annular recess 88 in the outside surface of rod 14.

Piston 12 contains two cylindrical chambers 90 and 92 separated by an internal annular shoulder 94, whose axial length slightly exceeds the axial length of the annular recess 88 in the outside surface of rod 14. It will be seen, therefore, that when piston 12 is so located on rod 14 that shoulder 94 coincides with recess 88, fluid connection between bore 80 and chambers 90 and 92 is cut off.

Chamber 90 is in fluid connection with the space 95 above rack 18 through port 96, and this space 95 is, in turn, in fluid connection with chamber 68 through the bore 98 and check valve 100.

Similarly, chamber 92 is in fluid connection with chamber 68 through the passageway 102, and check valve 104.

It is to be noted that conduit 52 connects with chamber 66, while conduit 50 connects with chamber 68. It is also to be noted that chamber 95 above rack 18 can be connected to a pressure fluid reservoir through outlet 106.

With a brief reference to the operation of the actuator device shown in FIGURE 1, it is to be understood that rotation of pinion gear 16 in a clockwise direction will result in movement of piston 12 to the left, as seen in FIGURE 1, thereby causing pressure fluid to move from chamber 68 out through conduit 50. Under certain circumstances, as will be explained later, movement of piston 12 to the left will also cause fluid to pass through valve 104 into passageway 102, to chamber 92, radial bore 86, and longitudinal bore 80 to conduit 54.

Movement of piston 12 to the right, as seen in FIGURE 1, will cause pressure fluid to move from chamber 66 out through conduit 52. Again, under certain circumstances, such movement of piston 12 to the right might cause pressure fluid to enter from conduit 54 into bore 80, radial bore 86, and eventually to chamber 68.

Referring now to FIGURE 3, the slave unit illustrated is constructed quite similarly to the actuator unit shown in FIGURE 1 in most important respects. Thus, slave unit cylinder 30 contains a cylindrical cavity having a cylinder liner 110. Cylinder 30 is formed of two components which are sealed by gland 112.

Piston 32 carries a sealing gland 114 and is longitudinally slotted along its bottom edge to ride on a guide key 116.

The internal volume of cylinder 30 is also divided into two separate chambers separated by piston 32. The first of these chambers 120 is connected to conduit 50 through a port 122 in the end wall of the cylinder, while chamber 124 at the opposite end of the cylinder, is connected to conduit 52 through the space 126 above rack 36, and through the annular space containing the teeth of pinion gear 38.

Rod 34 contains a longitudinal bore 128 extending from fluid connection with conduit 54 through port 130, to a point 132 located between the ends of rod 34. Bore 128 is connected with an annular recess 134 in the outside surface of rod 34 through one or more radially extending apertures 136. Recess 134 is also connected with chamber 124 through space 126 and the keyway for key 116 through two radial passageways 138, through piston 32 whenever these passageways are aligned with recess 134. It is to be particularly noted that the diameter of radial passages 138 equals the width of recess 134, and that this size is quite small so that fluid connection between bore 128 and chamber 124 is only accomplished when passages 138 are juxtaposed with annular recess 134.

As briefly mentioned above, the remote control device in accord with the invention operates to rotate shaft 40 through the rotation of primary shaft 20. The relative sizes of pinion gears 16 and 38 are chosen to gain a 4 to 1 gear reduction. However, it will be appreciated that any desired gear ratio can be employed.

Rotation of shaft 20 in the clockwise direction as seen in FIGURE 1, causes pressure fluid to move from chamber 68 through conduit 50 to chamber 120, which causes piston 32 to move to the left, as seen in FIGURE 3, resulting in a corresponding clockwise rotation of pinion gear 38 and shaft 40. Anticlockwise rotation of pinion 16 causes pressure fluid to move from chamber 66 through conduit 52 to chamber 124, thereby causing piston 32 to move to the right and effecting a counter clockwise rotation of gear 38.

Should temperature change or gland leakage cause slave unit piston 32 to take up a position on either side of midstroke while the actuator unit piston 12 is at midstroke, the system is de-synchronized. Re-synchronization automatically takes place as follows.

Visualizing a situation where the slave piston is not at midstroke while the actuator piston is at midstroke, movement of the actuator piston to the right will cause further rightwards movement of slave piston 32, and movement of the actuator piston to the left will cause corresponding movement of the slave piston. If, however, the leftwards movement of the slave piston is enough to bring it through its midstroke position (midstroke position being defined as that position wherein passages 138 are aligned with annular recess 134), any subsequent rightwards movement of this piston in response to rightwards movement of the actuator piston will result in the slave piston arriving at its approximate midstroke position *before* the actuator piston arrives at *its* midstroke position. Continued rightwards movement of the actuator piston towards its midstroke piston will then cause no further corresponding movement of the slave piston, because with passages 138 aligned with annular recess 134, movement of the actuator piston to the right before it reaches its datum point will cause fluid to move from chamber 66 through conduit 52, space 126, and chamber 124, to passage 138 and recess 134, and into bore 128. From bore 128, the fluid will pass through conduit 54 into bore 80 of the actuator unit rod 14. Because annular shoulder 94 is not aligned with recess 88 (because the actuator piston has not yet reached its datum point, as previously mentioned), fluid will move from bore 80 into chamber 90 through space 96 and finally out through check valve 100 into chamber 68. This particular movement of the pressure fluid which amounts to a leakage past piston 12, will continue with the rightward movement of piston 12 until it reaches its datum point, i.e., until shoulder 94 is aligned with recess 88, at which moment the flow of fluid just described or leakage of pressure fluid through piston 12 will cease. Thus, synchronization has been accomplished, as both the slave and actuator pistons are at their respective datum points. Further rightwards movement of the actuator piston will cause annular shoulder 94 to move out of registry over annular recess 88, but fluid will not be able to move from chamber 92 to chamber 68, because of the check valve 104. Consequently, fluid pressure will build up in chamber 66, causing fluid to move from chamber 66 through conduit 52 into chamber 124 of the slave unit, thereby causing slave unit piston 32 to move to the right, as desired.

Alternatively, if the slave piston takes up a position to the left of its midstroke position while the actuator piston is at its midstroke position, a re-sychonization will be effected as follows.

Movement of actuator piston 12 to the left will cause further leftwards movement of slave piston 32, and movement of the actuator piston to the right will cause corresponding movement of the slave piston. If, however, the rightwards movement of the slave piston is enough to bring the piston through its midstroke position, any subsequent leftwards movement will result in the slave piston arriving at its approximate midstroke position *before* the actuator piston arrives at *its* midstroke position. Continued leftwards movement of the actuator piston towards its midstroke position will cause no further corresponding movement of the slave piston because with the slave piston in its midstroke position, i.e., with passages 138 aligned with annular recess 134, continued movement of the actuator piston to the left prior to its reaching its own datum point, will cause pressure fluid to move through check valve 104, passage 102, chamber 92, annular recess 88, radial bore 86, longitudinal bore 80, and conduit 54, into longitudinal bore 128. With passages 138 aligned with recess 134, this fluid will then pass through these channels to chamber 124, or in other words, the pressure fluid will, in effect, leak through slave piston 32. This movement of pressure fluids will continue until shoulder 94 aligns with annular recess 88, at which point, re-synchronization has been effected. Continued movement of the actuator unit piston to the left past its datum point will no longer permit the flow of pressure fluid just described, as the fluid cannot move past shoulder 94 into longitudinal bore 80.

As mentioned above, the shoulder 94 on the inside of actuator piston 12 is slightly larger in axial length than is recess 88 in the outside surface of rod 14. It is necessary to provide this greater axial length in shoulder 94 to effect perfect synchronization because, for practical reasons, the annular recess 134 in the outside surface of slave unit rod 34 cannot be made infinitely small. Precise synchronization occurs only when both pistons are at their precise midstroke positions and the latter are more accurately defined as the midpoints of recesses 88 and 134. However, as the recess 134 cannot be made infinitely small, it is possible for pressure fluid to move from bore 128 through recess 134 and aperture 136 with the latter only partially aligned. Thus, the system would have fluid pressure movements associated with re-synchronization before actually desired. To overcome this difficulty, the shoulder 94 is made larger in axial length than the axial length of recess 88 by an amount which will be defined later but which, for the purpose of the following description of its function, will be regarded as equal to the combined widths of recess 134 and aperture 138. By this method, re-synchronization action, such as described earlier, will commence as soon as a passageway opens between aperture 138 and recess 134 but will be stopped as soon as shoulder 94 completely covers recess 88. At this point, the leading edge of shoulder 94 will be aligned with one edge of recess 88 while the trailing edge of shoulder 94 will be separated from the other edge of recess 88 by a distance equal to the combined widths of recess 134 and aperture 138. In other words, shoulder 94 will be half this distance away from its mid-stroke or datum position as defined by its alignment with recess 88. This is also the approximate distance which aperture 138 is from *its* mid-stroke or datum position as defined by its alignment with recess 134. Re-synchronization has, therefore, been accomplished while both actuator and slave unit pistons are located some small distance away from their respective mid-stroke positions and any further movement of the actuator unit piston, in either direction, will be accompanied by corresponding movement of the slave unit piston. It will be appreciated that the distance between precise mid-stroke and the position at which re-synchronization takes place can be very small as compared with the total length of stroke of the pistons.

In the above explanation of the purpose for which shoulder 94 is made longer than the axial length of recess 88, it was assumed that pistons 12 and 32 operated over a 1/1 stroke ratio or, in other words, that any movement of the one was accompanied by equal movement of the other. However, it is conceivable that a stroke ratio other than 1/1 may be required and the excess length of shoulder 94 over the axial length of recess 88 would then be governed also by the value of this ratio in order to achieve precise resynchronization. If, for instance, piston 32 moved over a shorter total operating stroke than that of piston 12, then shoulder 94 would be somewhat longer than the axial length of recess 88 plus the combined widths of recess 134 and aperture 138 because piston 12 will move a greater distance than piston 32 will in a given time. Alternatively, if piston 32 moves over a longer total operating stroke than that of piston 12, then shoulder 94 will be somewhat shorter than the axial length of recess 88 plus the combined widths of recess 134 and aperture 138. The precise length of shoulder 94 will also be governed by the accuracy required of the equipment made in accordance with this invention. In as much as the widths of recess 134 and aperture 138 can, in any case, be made very small in comparison with the total operating stroke of piston 32, small variations in the length of shoulder 94 can be ignored for most practical purposes of the invention.

It will be appreciated that, when applied to such installations as a marine steering gear, the control will pass through its midstroke position frequently, resulting in automatic and recurrent re-synchronizing, as just described, before any desynchronizing tendencies can become critical.

It will be appreciated that the datum points mentioned above are defined by the location of the recess 88, and shoulder 94 in the case of the actuator unit, and by the location of the passages 138 and recess 134, in the case of the slave unit. In the control of marine steering gear, these datum points normally are selected as to correspond with the midstroke positions of the actuator and slave pistons, and with the center position of the steering wheel and rudder. However, in other applications, it may be preferable to locate these datum points at positions not corresponding with the midstrokes of the pistons, and this can be readily accomplished by relocating the channels referred to, that is, by relocating passages 138, recess 134, and shoulder 94 and recess 88.

From the above description of the first preferred embodiment of the invention, it will be appreciated that the invention essentially consists of a hydraulic remote control apparatus having a fluid pumping means and a moveable member (slave piston) which responds to fluid pressures built up by the pumping means, and that re-synchronization of this system takes place when the movable member is at a predetermined datum point which the pumping means has not yet reached, but is moving towards a predetermined datum position in its pumping cycle.

The alternative actuator unit shown in FIGURES 5 to 11 inclusive, when installed in a total apparatus with a slave unit such as previously described, achieves re-synchronization in the exact same manner defined above. That is, re-synchronization takes place when the movable member of the slave unit has reached a predetermined datum position in its cycle of movement while the pumping means of the actuator unit is moving towards but has not yet reached a predetermined datum position in the pumping cycle.

The alternative actuator unit is fully interchangeable with the actuator unit shown in FIGURE 1. Thus, it contains the essential components of the first, i.e., the pumping means, and a bypass valve to permit pressure fluid to move past the movable member of the slave unit as required to maintain synchronization.

The actuator unit shown in FIGURES 5 to 11 inclusive, although somewhat more complicated than the previously described actuator unit, has the advantage that a larger ratio of turns at the actuator end to turns at the slave end can be achieved, whereas in the case of the FIGURE 1 actuator unit, this ratio can only be varied by the gearing between the steering wheel and the actuator unit, and between the slave unit and the rudder (using a vessel steering system as an example) or by elongating the actuator unit cylinder and increasing the volume of the slave unit cylinder. With the actuator unit in accord with FIGURES 5 to 11, this ratio can be otherwise adjusted. In the actuator unit according to FIGURE 1, increasing this ratio by changing the length of the actuator cylinder is governed by practical consideration as a very long cylinder would occupy excessive space. However, the alternative actuator unit, although quite compact, can achieve the large ratio desired. With this unit, a helmsman can revolve the steering wheel through a very large number of turns before the rudder completes its full steering cycle. In other words, very delicate control of the rudder is possible.

Referring now to FIGURE 5, the alternative actuator unit is contained within an outer casing 150 having an end plate 152 held in position by appropriate screws 154 and sealed against pressure fluid by O rings or the like 156.

Projecting through end plate 152, there is a rotatable shaft 160 which may constitute an extension of the shaft of a steering wheel, for example, or which may be coupled to such a steering wheel shaft through a gear reducer. In any case, shaft 160 is equivalent to shaft 20 of the first embodiment of the actuator unit in the sense that both the shafts provide mechanical input to the actuator units.

Shaft 160 is rotatable within ball bearing race 162 and forms a seal with end plate 152 in conjunction with the O ring 164. A rotatable cylinder block 170 is keyed to shaft 160 by the keys 172. Cylinder block 170 contains six cylinder-like recesses 174, each of which receive pistons 176 adapted to reciprocate therein, and which are spring biased outwardly by springs 178. In this regard it will be noted that the invention is not necessarily restricted to a six cylinder assembly as block 170 may contain either more or less than six cylinders. The other ends of pistons 176 are rounded and are surrounded with end caps 180 which bear on swash plate 182 which is free to rotate about an axis forming an angle with the longitudinal axis of shaft 160. Rotation is assisted by the ball bearing members 184 spacing the member 182 from the fixed member 186, carried by the end plate 152.

As viewed in FIGURE 5, the right hand end of rotatable cylinder block 170 bears against a bearing plate 190 which is carried in a recess within a disc member 192, which is fixed to the inside wall of casing 150. The disc or cylindrical block 192 is centrally apertured to receive a needle bearing 193 which supports the right hand end of shaft 160. The latter carries a single tooth gear 194, which is adapted to engage a pinion gear 196. The purpose of these latter members is explained hereinafter.

Referring to FIGURE 7, it will be noted that bearing plate 190 carries two opposed slots 200 and 202. The right hand ends (as seen in FIGURE 5) of each of the cylinders 174 in cylinder block 170, carry apertures 204 which are aligned with slots 200 and 202, whereby to provide fluid interconnection between the cylinders 174 and the slots 200 and 202. Thus, it can be seen that, as the cylinder block 170 is rotated with the rotation of shaft 160, fluid will be either pumped into slot 200 and withdrawn from slot 202, or vice versa, depending on the direction of rotation of shaft 160. Slots 200 and 202 are, therefore, equivalent to chambers 66 and 68 of the FIGURE 1 actuator unit. In the latter device, movement of piston 12 resulted in an increase of fluid pressure in either of chambers 66 or 68, depending upon the direction of movement of cylinder 12, and in the same sense, slots 200 and 202 act as equivalent chambers, within which pressure fluid is increased, depending upon the direction of rotation of shaft 160. As will become apparent from the following specification, an increase in fluid pressure within either of slots or chambers 200 or 202 is transmitted through appropriate conduits to a slave unit, such as the member shown in FIGURE 3, whereby to cause movement of the slave unit piston which, in the normal course, effects rotation of the output shaft of the slave unit in direct proportion to the movement of the input shaft 160 of the actuator unit.

Referring again to FIGURE 5, it will be noted that a second block member 210 is fixed to the right hand face of block or disc 192. The overall shape of block 210 can best be seen in FIGURE 8, from which it will be noted that block 210 carries a vertical bore 212, and a transverse bore 214, the left hand end of which is closed by a plug 216. Bore 212 is enlarged at one point to provide a chamber 218, to which access is gained through another bore 220, which connects with bore 222 leading to outlet (or inlet) 224 (see FIGURES 5 and 9).

Received within vertical bore 212 in block 210, there is a spindle valve-like plunger 230, which is fixed to a slotted block 232. Block 232 has received within its slot 234 a slide 236 freely carried on a pin 238 fixed to the pinion gear 196. As pinion gear 196 is rotated, plunger 230 rises and falls, completing a full cycle during one complete revolution of gear 196. As previously mentioned, gear 196 is meshed with a single tooth gear 194, which is fixed to the end of shaft 160. Thus, a large number of turns of shaft 160 is required to complete a full rotation of gear 196, and a full cycle of up and down movement of plunger 230. At its lower end, plunger 230 carries a shoulder 231 having an axial length slightly greater than the axial length of recess 218 by an amount that is governed by similar considerations to those referred to earlier when describing the length of shoulder 94 of the first preferred embodiment of the invention. Shoulder 231 does, in fact, serve a similar purpose to that of shoulder 94 but the length of shoulder 231 is governed also by the gearing which causes lateral movement of the plunger 130 within the bore 212 and which affects the movement of shoulder 231 in relation to that of aperture 138 of the slave unit.

With respect to the description above of the means for effecting vertical reciprocation of plunger 230, it will be appreciated that alternative means to the single tooth gear 194 may be used to effect slow rotation of gear 196. Thus, a Geneva mechanism or similar device could be used.

Referring now to FIGURE 10, it will be noted that chamber 202 is connected through aperture 250, check valve 252, and bore 254, with the space between the disc 192 and the end wall of casing 150. Chamber 202 is also connected through bore 256 to inlet or outlet 258, and through aperture 260, check valve 262 and bore 214 to vertical bore 212 (see FIGURES 8 and 9). Referring to FIGURE 11, it will be noted that the other chamber 200 is connected through bore 264 to outlet or inlet 266.

The actuator unit illustrated in FIGURES 5 to 11, as coupled to a slave unit such as the type shown in FIGURE 3, operates as follows. Rotation of shaft 160, say in the clockwise direction as shown in FIGURE 6, would cause pistons 176 to increase the fluid pressure within chamber 202. In the normal course, pressure fluid would then move from chamber 202 through conduit 50 to chamber 120 of the slave unit thereby causing slave piston 32 to move to the left and gear 38 to rotate clockwise, both as seen in FIGURE 3. At the same time, pressure fluid would move from chamber 124 of the slave unit through conduit 52 to chamber 200. Conversely, rotation of shaft 160 counterclockwise as seen in FIGURE 6 would result in pressure fluid movements opposite to those just described.

When de-synchronization occurs so that the slave unit piston reaches its datum position before the pumping means (shaft 160, cylinder block 170, etc.) of the alternative actuator unit reaches the datum position of its pumping cycle, the system effects automatic re-synchronization in a manner very similar to the method previously described. In this case, the datum position of the pumping cycle is represented by the location of the annular recess 218 in bore 212. Thus, when shoulder 231 is aligned with recess 218 the pumping cycle is at the datum position. Should the slave piston be at its datum position while the pumping cycle has not yet reached but is approaching its datum position so that shoulder 231 is moving towards recess 218, pressure fluid will move, for example, from chamber 202 through passageways 256 and 260, and through check valve 262, bore 214, vertical bore 212 bore 222 and conduit 54 and so on through bore 128 of the slave unit whereby to bypass the slave piston 32, leaving the latter at rest until the pumping cycle reaches its datum position, i.e., until shoulder 231 mates with recess 218 and closes the bypass channel just described. It will be appreciated that a similar bypass channel is opened up should the slave piston reach its datum position while shoulder 231 is on the opposite side of and is moving towards the recess 218. In this case, pressure fluid will pass through bore 128 of the slave unit to conduit 54 and into the space 270 at the end of the actuator unit, through bore 222 and the lower portion of vertical bore 212. From space 270, the fluid will move through bore 254 and through check valve 252 to chamber 202.

It can be seen from the above description of the alternative actuator unit that re-synchronization takes place in the identical manner as with the first described actuator unit. The two units only differ in mechanical respects and are functionally similar. The check valves in both cases perform the same function of closing the slave piston bypass channels when the slave piston has reached its datum position while the pumping means of the actuator units are not at their datum positions and are moving *away* from such positions. The bypass channels are only opened when the pumping means are *approaching* the datum positions in their pumping cycles.

What I claim as my invention is:

1. A hydraulic remote control apparatus adapted to automatically maintain synchronization, said apparatus comprising an actuator unit, a slave unit and conduit means operatively connecting said units; said actuator unit and said slave unit each comprising a cylinder, a rod mounted coaxially within said cylinder, a piston mounted coaxially on said rod for reciprocation, a first chamber defined by one end of said cylinder and said piston, said rod having a longitudinal bore extending from a first end located at one end of said rod to a second end located between the ends of said rod; said conduit means comprising a first conduit connecting the first end of said actuator unit rod bore with the first end of said slave unit rod bore, a second conduit connecting the first chamber of the actuator unit with the second chamber of the slave unit and a third conduit connecting the second chamber of the actuator unit with the first chamber of the slave unit, said actuator unit having passage means normally connecting the second end of said actuator unit rod bore with the first chamber of said actuator unit, means carried by said actuator unit piston for closing said passage means when said actuator piston unit is at a predetermined datum point in its reciprocation cycle, said datum point normally being selected to correspond with the midpoint of the stroke of said piston, slave unit passage means connecting the second end of said slave unit rod bore with the first chamber of the slave unit when said slave unit piston is at a predetermined datum point in its reciprocation cycle, said slave unit passage means being closed when said slave unit piston is not at said datum point, the said slave unit piston datum point normally being selected to correspond with the midpoint of the stroke thereof.

2. An apparatus as claimed in claim 1, in which said actuator unit passage means includes two separate channels, the first of said channels being open when said actuator unit piston is on one side of its datum point and closed when said piston is on the opposite side of said datum point, the reverse situation holding true for the second channel.

3. An apparatus as claimed in claim 2, in which said first channel carries a check valve which prevents the entry of pressure fluid into said first channel from said first chamber, and in which said second channel carries a check valve which prevents the entry of pressure fluid into said first chamber from said second channel.

4. An apparatus as claimed in claim 1, in which said actuator unit passage means includes a pair of cavities within said actuator unit piston and about said actuator unit rod, a first channelway connecting one on said cavities with the first chamber of the actuator unit, the other channelway connecting the other cavity with said first chamber of the actuator unit, and a radial bore in said rod connecting the longitudinal bore of said rod with one of said cavities when said actuator piston is on either side of its datum point.

5. An apparatus as claimed in claim 4, in which said means for closing said actuator unit passage means comprises an internal annular collar separating said cavities, which collar covers said radial bore when said actuator unit piston is at its datum point.

6. A hydraulic remote control apparatus adapted to automatically maintain synchronization, said apparatus comprising an actuator unit, a slave unit and a plurality of conduits operatively interconnecting said units, said actuator unit having pumping means for moving pressure fluid out of a first chamber in said actuator unit through one of said conduits to a second chamber in said slave unit and for moving pressure fluid out of a second chamber in said actuator unit through another of said conduits to a first chamber in said slave unit, said slave unit having a movable member adapted to move in two opposed directions in response to variations in the fluid pressures within the first and second chambers of said slave unit whereby said movable member moves in response to fluid pressures originating at said pumping means, and by-pass means through which said pressure fluid by-passes said movable member when the latter reaches a predetermined datum position in its cycle of movement, thereby causing said movable member to remain stationary, while said pumping means is moving towards but has not yet reached a predetermined datum position in its pumping cycle, said by-pass means including check valves for closing said by-pass means when said movable member of the slave unit reaches its datum position while said pumping means is not at and is moving away from the datum position in its pumping cycle.

7. A hydraulic remote control apparatus adapted to automatically maintain synchronization, said apparatus comprising an actuator unit, a slave unit and a plurality of conduits operatively interconnecting said units, said actuator unit comprising a casing, an input shaft mounted for rotation within said casing and projecting therefrom for connection with a control mechanism, a cylinder block carried coaxially on said shaft for rotation therewith, a plurality of cylinders in said cylinder block, said cylinders being arranged parallel to and spaced about said shaft and having one end open, pistons within each of said cylinders and having a portion thereof projecting from said open ends, a swash plate arranged at an angle to and concentric with said shaft, said pistons being spring biased outwardly against said swash plate whereby rotation of said shaft causes said pistons to reciprocate within said cylinders, a first chamber open to said cylinders whereby to receive pressure fluid therefrom upon movement of said pistons through the action of the swash plate as said cylinder block is rotated in one direction, one of said conduits connecting said first chamber to a second chamber in said slave unit, a second chamber in said actuator unit and open to said cylinders to receive pressure fluid therefrom when said cylinder block is rotated in the opposite direction, another of said conduits connecting the second chamber of the actuator unit to a first chamber in said slave unit, said slave unit having a movable member adapted to move in two opposed directions in response to variations in the fluid pressure within the first and second chambers of said slave unit whereby said movable member moves in response to fluid pressures originating in the first and second chambers of the actuator unit; said actuator unit further including a plunger operatively connected to said shaft for reciprocation within a bore in a block carried within said casing, means connecting said plunger and shaft to effect a single reciprocation cycle of said plunger for a large number of rotations of said shaft, a plurality of passageways connecting said plunger bore from opposite sides of a datum position of said plunger with said conduits, said plunger bore and connecting passageways constituting by-pass means through which said pressure fluid by-passes said movable member of the slave unit when the latter reaches a predetermined datum position in its cycle of movement, thereby causing said movable member to remain stationary, while said plunger is moving towards but has not reached a predetermined datum position in its cycle of movement.

8. A hydraulic remote control apparatus as claimed in claim 7, in which said bypass means includes check valves for closing said bypass means when said movable member of the slave unit reaches its datum position while said plunger is not at and is moving away from its datum position.

References Cited by the Examiner

UNITED STATES PATENTS 2,546,462   3/51   Link _____ 60—52

FOREIGN PATENTS 517,314   1/40   Great Britain.

JULIUS E. WEST, *Primary Examiner.*

EDGAR W. GEOGHEGAN, *Examiner.*